June 9, 1931.   B. H. URSCHEL   1,808,798
UNIVERSAL JOINT BOOT
Filed March 7, 1928    3 Sheets-Sheet 3
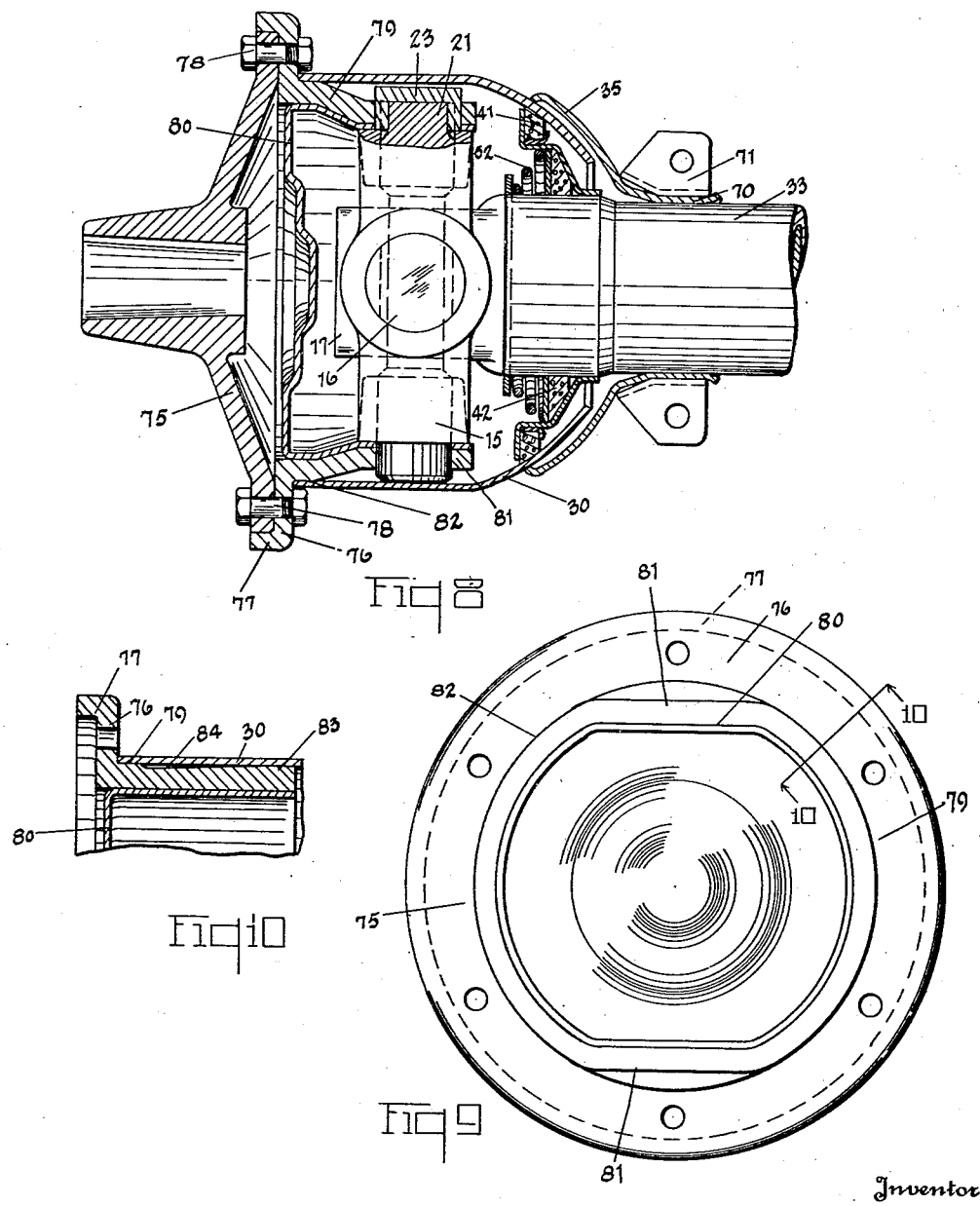

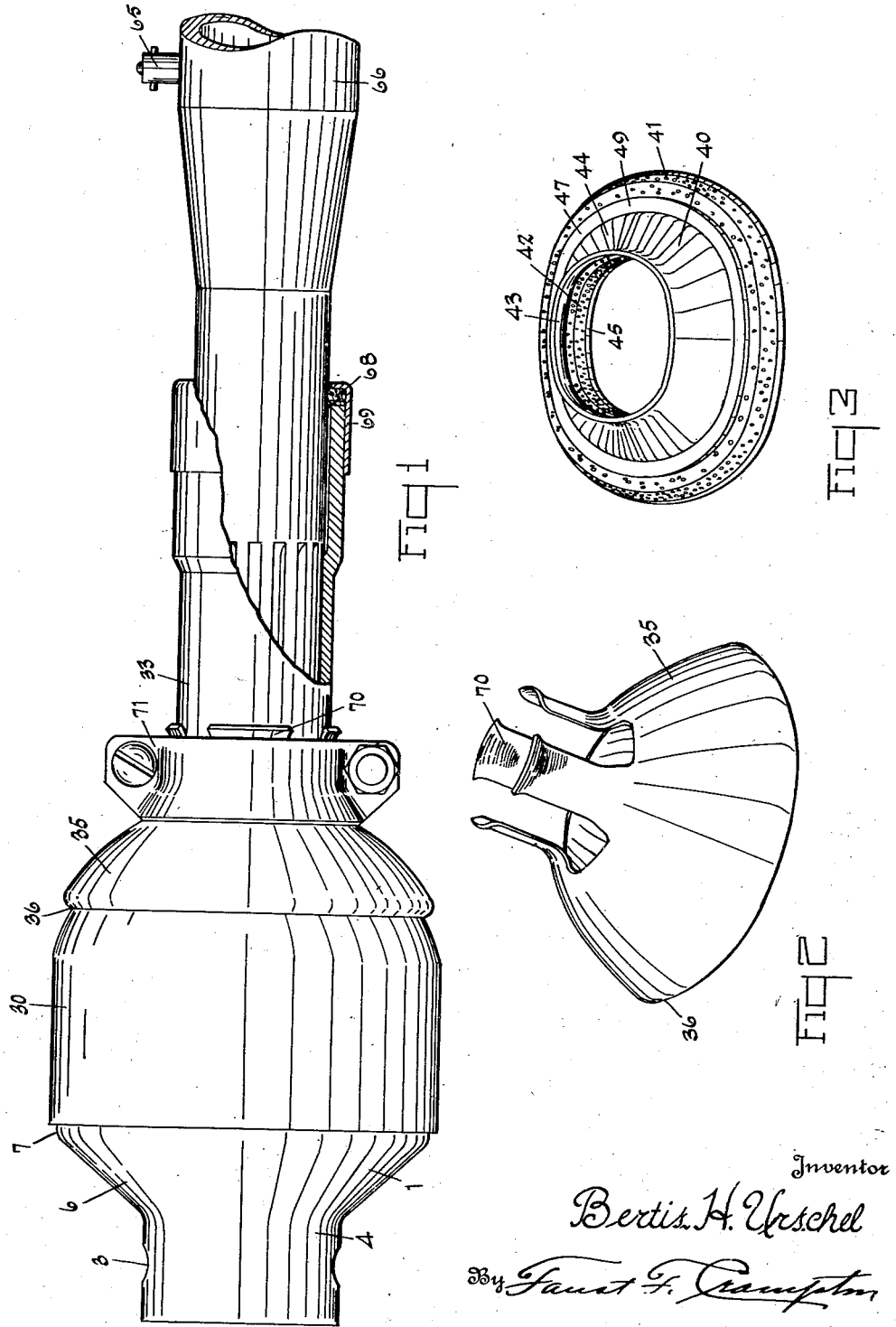

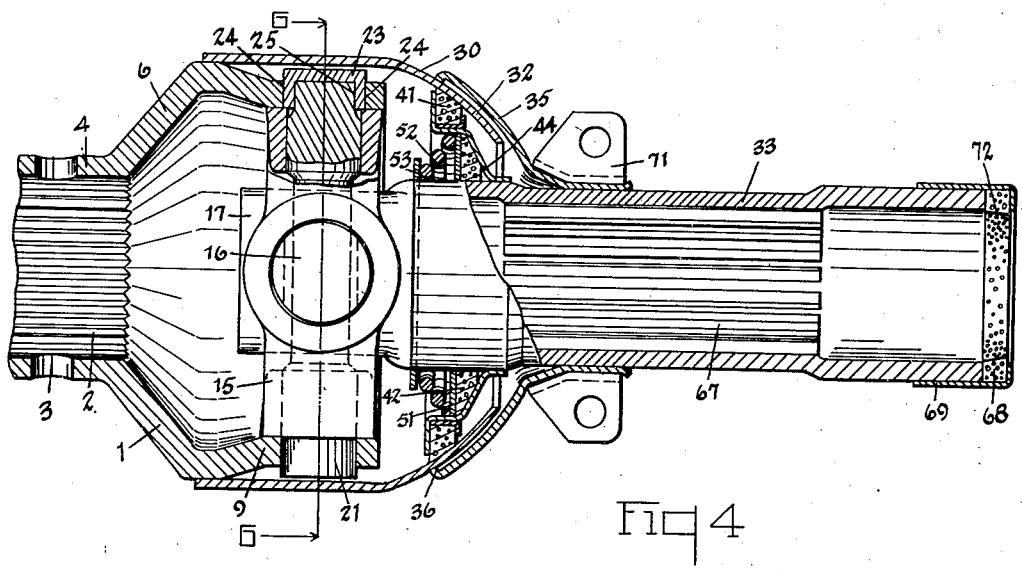
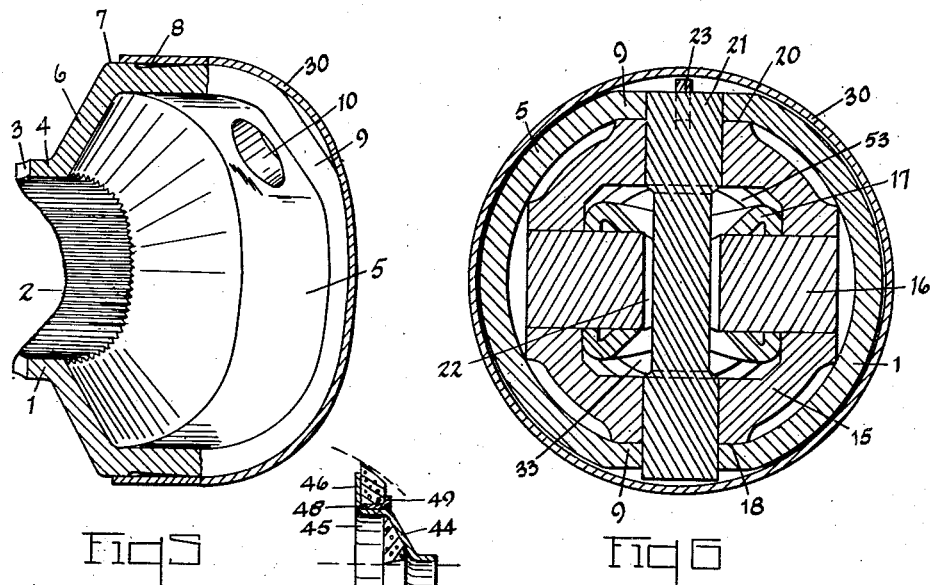
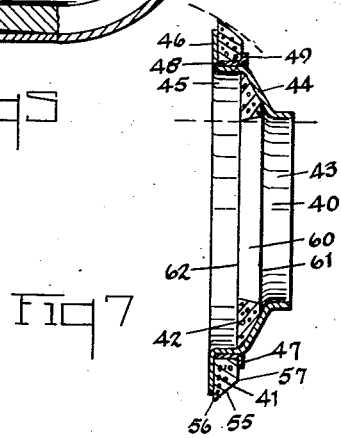

Patented June 9, 1931

1,808,798

UNITED STATES PATENT OFFICE

BERTIS H. URSCHEL, OF BOWLING GREEN, OHIO, ASSIGNOR TO URSCHEL ENGINEERING COMPANY, OF BOWLING GREEN, OHIO, A CORPORATION OF OHIO

UNIVERSAL JOINT BOOT

Application filed March 7, 1928. Serial No. 259,800.

My invention has for its object to provide a universal joint housing of the type commonly used in self-propelled vehicles but which is so formed that it may be readily closed by means of a cup that fits over a shell through which the power is transmitted, and which is adapted to receive and enclose the joint. The invention thus provides an efficient lubricant container for a power transmission universal joint which may be made at a low cost of production. The invention also provides an efficient sealing plate that increases the utility of the enclosing cup member and produces an effective lubricant seal in such a structure.

The invention thus provides a structure wherein the shell, through which the power is transmitted, may be connected to one end of a part of the power transmission mechanism, such as the driving shaft of an engine, and the universal joint may be inserted through the open end of the shell and the boot assembled and closed by the cup.

The invention also has for its object, other features and advantages which will appear upon examination of the drawings and from the description hereinafter.

The invention may be contained in boot structures that vary in their details and, to illustrate a practical application of the invention, I have selected a universal joint boot containing the invention, as an example of such structures, and shall describe it hereinafter. The universal boot joint referred to is shown in the accompanying drawings.

Fig. 1 of the drawings illustrates a side view of the boot and the telescoping shafts associated therewith. Fig. 2 is a perspective view of the closure cap of the boot. Fig. 3 illustrates the lubricant sealing plate. Fig. 4 is a view of the section of the universal joint illustrated in Fig. 1, one of the parts of the telescoping shaft being shown as removed. Fig. 5 is a perspective view of the power transmission shell of the universal joint. Fig. 6 is a view of a section taken on the plane of the line 6—6 indicated in Fig. 4. Fig. 7 is a view of a section of the lubricant sealing plate when removed from the boot and illustrates the normal position of the sealing surfaces of its sealing rings. Fig. 8 illustrates a section of a universal joint and its boot having a power transmission shell modified in structure from that shown in Figs. 1 and 4. Fig. 9 is an end view of the power transmission shell shown in Fig. 8. Fig. 10 is a view of a section taken on the plane of the line 10—10 of a part of the transmission shell shown in Fig. 9.

The universal joint illustrated in Fig. 1 has a power transmission shell 1 that is connected to one of the members of the mechanism through which the power is transmitted, such as to the engine shaft. The shell 1 may be provided with a plurality of inwardly extending splines 2 for keying it to the shaft to which it is connected. Also, if desired, it may be provided with openings 3 through which a locking pin may be inserted. The shell 1 flares from the neck 4, in which the splines 2 are located, and then extends substantially cylindrically, as at 5, from the flaring skirt 6. This provides a chamber for receiving the universal joint through its end. The shell 6 is made of relatively thick sheet metal which, however, may be die formed and broached to form splines 2 and bored to receive one of the pins of the universal joint for connecting the shell to the universal joint. The outer surface of the shell has a land 7 that extends cylindrically around the shell 1 and, preferably, near the point of juncture of the flaring portion 6 with the cylindrical part 5. It is, preferably, cut back slightly along the part 8 which forms the land 7 for producing a tight fit for the cup that is used to close the shell. The shell, however, is provided with flattened portions 9 located at diametrically opposite points of the cylindrical part 5 of the shell and these portions are bored to form the holes 10, whereby connection may be made between the power transmission shell and the universal joint.

The universal joint is of the type well known in the art and it is provided with the universal joint ring 15 having the pin 16 whereby the part of the shaft joined to the shell is swiveled within the joint, the head 17 of the said part of the shaft being connected to the ring 15 by means of the pin 16. The ring thus connected to the head 17 is inserted in the end of the shell 1 so that the lateral bearing surfaces 18 of the ring 15 are located in contact with the flattened portions 9 of the shell 1 and the pin 21 is inserted through the holes 10, through the ring 15 and through the hole 22 that is formed in the pin 16. The pin 21 is keyed to the shell, preferably, by means of the staple shaped key 23 that fits notches 24 and 25 that are formed in the edge portions of the holes 10 and at diametrically opposite points in the cylindrical surfaces of one end of the pin 21. Also, if desired, a transversely extending notch, or channel, may be formed in the end of the pin 21 for receiving the shank or crotch of the staple.

The shell 5 is closed and the joint is enclosed by means of a cup 30 that may be made of relatively thin sheet metal and die pressed to form. The edge of the cup 30 fits the cylindrical part 5 of the shell and thus may be slid over the part 5 of the shell 1 until its edge portion is forced up or outwardly on the land 7 where it will be tightly and elastically secured. When the cup 30 is thus positioned, it will enclose and cover the ends of the pins 16 and 21 and prevent endwise movement, particularly of the pin 21, and also will secure the keying staple 23 in its position to lock the pin 21, on which the ring 15 swivels. The bottom 32 of the cup is spherical, having its centers in the center of the universal joint, such as at the crossing between the axes of the pins 16 and 21. The bottom of the cup has an opening through which the part 33 of the telescoping shaft may be inserted. The cup 30, moreover, is held in its position with reference to the shell 1, and the interior of the boot is protected against dust and splash by means of the closure cap 35, having an edge portion 36 that is turned inward so as to make contact with the exterior of the cylindrical portion 32 of the cup. The edge surface of the closure cap 35 conforms to the cylindrical surface 32 of the cup 30 and thus the cup 30 is held in its position with reference to the shell 1, notwithstanding the swiveled and rotary movements of the parts.

The interior of the boot may be filled with a lubricant that will be sealed as against escape from the boot by means of the sealing plate 40. The sealing plate is provided with sealing rings 41 and 42 that may be formed of fibrous material, such as cork or leather. The lubricant sealing plate 40 has a cylindrical part 43 that substantially fits the surface of the part of the shaft 33. It also has a conical portion 44 that joins the cylindrical part 43 and terminates in a cylindrical part 45. The part 45 is joined with a laterally extending flange 46. The sealing ring 41 is placed on the flange 46 and its size is such as to substantially fit the cylindrical portion 45. The flanged ring 47 has a part 48 that substantially fits the exterior surface of the part 45, and a flange 49 that extends laterally from the body portion of the ring 47. When the sealing ring 41 has been placed in position, the ring 47 is forced between the ring 41 and the plate 40 which operates to expand the elastic sealing ring 41 and the flange 47 operates to clamp the ring 41 against the flange 46 of the sealing plate 40. The sealing ring 42 is shaped to lie within the conical surface of the portion 44 so as to fit the exterior surface of the part of the shaft 33. A washer 51 engages one side of the ring 42 and a spring 52, located intermediate a washer 53 and the washer 51, operates to press the ring 42 against the conical surface 44 which acts to direct the pressure of the cork ring against the shaft by reason of the crowding action of the spring 52. The washer 53 shoulders against enlargements of the head 17 formed on the end of the of the part 33 of the shaft which operates to hold the washer 53 in position against the pressure of the spring 52.

The ring 41 has surfaces 55 that extend at an angle to the inner spherical surface of the spherical part 32 of the cup and, consequently, under the pressure of the spring 52 the edge 56, located on the lubricant side of the body portion of the ring 41, is compressed to a greater extent than the edge 57, and there will be a decreased pressure per unit of area between the maximum at the edge 56 and the minimum at the edge 57 of the ring 41, whereby there will be produced an efficient seal since the edge that is pressed the greater will scrape the lubricant film into the interior of the boot while the outer edge will allow the ring to "roll over" the film which will be subsequently caught by the greater pressed edge 56 on a return angular movement of the part 33 of the shaft to the axis of the cup 30, during the rotation of the shell and the cup. Also, the ring 42 is provided with a surface 60 that is normally located at an angle to the cylindrical surface of the part of the shaft 33 on which the plate is located. The diameter of the edge 61 is, preferably, slightly smaller than the diameter of the part of the shaft on which the ring 42 is to be located, and the edge 62 has a slightly lesser diameter than that of the edge 61 of the ring 42 so that when the plate is located on the shaft 33, the edge 62 is pressed with a greater pressure on the cylindrical surface of the shaft than the edge 61 and the pressure decreases per unit of area progressively from the edge 62 to the edge 61 of the ring 42. Also, the conical surface 44 and the spring 52, operating on the washer 51, causes the sealing ring 42 to be crowed towards the shaft 33. The sealing plate is thus constructed as to coact with the cup to contain and seal the lubricant that may be located within the boot. If desired, the lubricant may be inserted through the valve gland 65 that communicates with the hollow telescoping shaft. The gland 65 is located on the part 66 of the shaft which is splined thereto by the interfitting splines 67 located on the parts 33 and 66. A sealing ring 68 may be located at the end of the part 33 of the shaft and a cap or ferrule 69 may be used for securing or sealing the ring 68 in position. If desired, the inner contacting sealing surface 72 of the ring 68 may be constructed substantially the same as the surface 60 of the sealing ring 42 in order to maintain the lubricant within the part 33 of the shaft.

The parts are assembled by inserting the ring within the end of the shell 1 and connecting the joint to the shell 1 by means of the pin 21 and locking it in position by means of the key 23. The washer 53, the spring 52, the washer 51 and the plate 40, may be thus inserted on the part 33 of the shaft and the cup 30 may also be located on the shaft, and the cup pushed along the end of the shaft until its edge is engaged by the land 7 of the shell 1 which operates to locate all of the parts in their desired position. The closure cap 35 is then placed on the part 33 of the shaft. The closure cap 35 is provided with fingers 70 that substantially fit the part 33 of the shaft, and yet afford an expandible means in order to slip the closure cap 35 over the enlargements of the part 33 of the shaft. The cap 35 is pushed along the part 33 until its edge 36 engages the spherical portion of the cup 30, and it then is clamped to the part 33 of the shaft by the split clamping ring 71 that encloses the fingers 70.

The shell may be connected to a flanged connector 75 as shown in Fig. 8. Thus the shell may be provided with a lateral extending flange 76 having a cylindrical edge portion 77. The connector 75 and the flange 76, are connected together by means of the bolts 78. The cylindrical edge portion 77, preferably, is so formed as to substantially fit the outer edge of the flanged connector 75. The shell 79 is, preferably, closed by means of a shell 80 that is also formed of sheet metal and is ordinarily made to conform to the cylindrical shape of the outer shell in advance of the flattening of portions of the shell 79. When the shell 80, that closes one end of the shell 79 and fits the interior of the body of the shell 79, is shaped with the shell 79 to form the flattened portions 81, the two shells are tightly locked together and the double thickness affords an increased bearing area for the transmission of power through the pin 21 of the universal joint. The shell 79 is also provided with the land 82 which the edge of the cup 30 is stretched to elastically and frictionally engage and thus connect the cup to the shell 79. The land 82 is formed by a reduced cross sectional part 84. The cup 30 also frictionally engages the edge 83 of the shell.

The parts are assembled and enclosed in the same manner as described in connection with the form of construction shown in Figs. 1 and 4.

I claim:

1. In a universal joint, a shell, a cap for closing one end of the shell, the shell having flattened portions and forming bearings for a pin of the universal joint, a key for keying the said pin to the shell, a shaft, a sleeve fitting the end of the shell having the cap and covering the key and the ends of the pin to prevent displacement of the key and the pin, one end of the sleeve having a substantially spherical portion centered in the center of the universal joint and having an opening for receiving a section of the shaft, a closure plate and a gasket connected to the section of the shaft for closing the opening of the sleeve.

2. In a universal joint, a shell, a cap for closing one end of the shell, the shell having flattened portions and forming bearings for a pin of the universal joint, a key for keying the said pin to the shell, a shaft, a sleeve fitting the end of the shell having the cap and covering the key and the ends of the pin to prevent displacement of the key, one end of the sleeve having a substantially spherical portion centered in the center of the universal joint and having an opening for receiving a section of the shaft, a closure plate and a gasket connected to the section of the shaft for closing the opening of the sleeve, a flexible cover plate having flexible tongues conforming to the surface of the section of the shaft, and means for clamping the tongues to the section of the shaft.

3. In a universal joint, a shell, a cap having a flange fitting the interior of the shell, the shell and the flange of the cap having flattened portions and forming bearings for a pin of the universal joint, a shaft, a closure plate and a gasket connected to the shaft for closing the other end of the shell.

4. In a universal joint, a shell having a raised portion at one end and having a flattened portions forming bearings for a pin of the universal joint, a key for keying the said pin to the shell, a sleeve fitting the raised portion of the shell and covering the key and the ends of the pin to prevent displacement of the key and the pin, one end of the sleeve having a substantially spherical portion centered in the center of the universal joint and having an opening for receiving a section of the shaft, a closure plate and a gasket connected to the section of the shaft for closing the opening of the sleeve.

5. In a universal joint boot, a shell, a universal joint located in the shell, a shaft section extending into the shell and connected to the universal joint, a flexible cover plate for closing one end of the shell and having a flexible expanding neck and a clamping ring for clamping the neck of the flexible cover plate to the section of the shaft.

In witness whereof I have hereunto signed my name to this specification.

BERTIS H. URSCHEL